(12) United States Patent
Hofer et al.

(10) Patent No.: US 9,899,034 B2
(45) Date of Patent: Feb. 20, 2018

(54) TECHNOLOGIES FOR ROBUST CRYING DETECTION USING TEMPORAL CHARACTERISTICS OF ACOUSTIC FEATURES

(71) Applicant: Intel IP Corporation, Santa Clara, CA (US)

(72) Inventors: Joachim Hofer, Munich (DE); Tobias Bocklet, Munich (DE); Georg Stemmer, München (DE); David Pearce, El Dorado Hills, CA (US); Sebastian Czyryba, Mragowo (PL); Josef G. Bauer, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/979,108

(22) Filed: Dec. 22, 2015

(65) Prior Publication Data

US 2017/0178667 A1    Jun. 22, 2017

(51) Int. Cl.
*G10L 25/51* (2013.01)
*G10L 25/24* (2013.01)
*G10L 25/72* (2013.01)
*G10L 25/27* (2013.01)

(52) U.S. Cl.
CPC .............. *G10L 25/51* (2013.01); *G10L 25/24* (2013.01); *G10L 25/27* (2013.01); *G10L 25/72* (2013.01)

(58) Field of Classification Search
None
See application file for complete search history.

(56) References Cited

U.S. PATENT DOCUMENTS

| | | | |
|---|---|---|---|
| 5,668,780 A | 9/1997 | Hsieh | |
| 2009/0312660 A1* | 12/2009 | Guarino | A61B 5/08 600/529 |
| 2011/0313555 A1* | 12/2011 | Shoham | G10L 25/48 700/94 |
| 2012/0143610 A1 | 6/2012 | Wang et al. | |
| 2012/0226497 A1* | 9/2012 | You | G10L 15/08 704/231 |
| 2012/0265024 A1* | 10/2012 | Shrivastav | A61B 5/40 600/300 |
| 2013/0262115 A1 | 10/2013 | Chuang | |

(Continued)

OTHER PUBLICATIONS

Bhagatpatil Varsharani V and V. M. Sardar, "An Automatic Infants Cry Detection Using Linear Frequency Cepstrum Coefficients (LFCC)," Intl. J. Tech. Enhancements and Emerging Eng. Research, 3, 2347 (2015).

(Continued)

*Primary Examiner* — Douglas Godbold
(74) *Attorney, Agent, or Firm* — Barnes & Thornburg LLP (57) ABSTRACT

Technologies for identifying sounds are disclosed. A sound identification device may capture sound data, and split the sound data into frames. The sound identification device may then determine an acoustic feature vector for each frame, and determine parameters based on how each acoustic feature varies over the duration of time corresponding to the frames. The sound identification device may then determine if the sound matches a pre-defined sound based on the parameters. In one embodiment, the sound identification device may be a baby monitor, and the pre-defined sound may be a baby crying.

25 Claims, 7 Drawing Sheets

(56) References Cited

U.S. PATENT DOCUMENTS

2014/0336537 A1* 11/2014 Patel .................. A61B 7/003
                                                          600/586
2015/0073306 A1*  3/2015 Abeyratne ............ A61B 7/003
                                                          600/586
2015/0242180 A1   8/2015 Boulanger-Lewandowski et al.
2015/0281838 A1  10/2015 Hershey et al.

OTHER PUBLICATIONS

Rami Cohen and Yizhar Lavner, "Infant Cry Analysis and Detection," IEEE 27th Convention of Electrical and Electronics Engineers in Israel (2012) (Presentation).

Rami Cohen and Yizhar Lavner, "Infant Cry Analysis and Detection," IEEE 27th Convention of Electrical and Electronics Engineers in Israel (2012) (Paper).

Maria Antonia Ruiz, Carlos Alberto Reyes, and Luis Carlos Altamirano, "On the implementation of a method for automatic detection of infant cry units," Intl. Meeting of Electrical Engineering Research, Procedia Engineering 35 217-222 (2012).

PCT Search Report for International Application PCT/US2016/063347 dated Mar. 8, 2017 (3 pages).

Written Opinion for International Application PCT/US2016/063347 dated Mar. 8, 2017 (6 pages).

* cited by examiner

Figure 2:
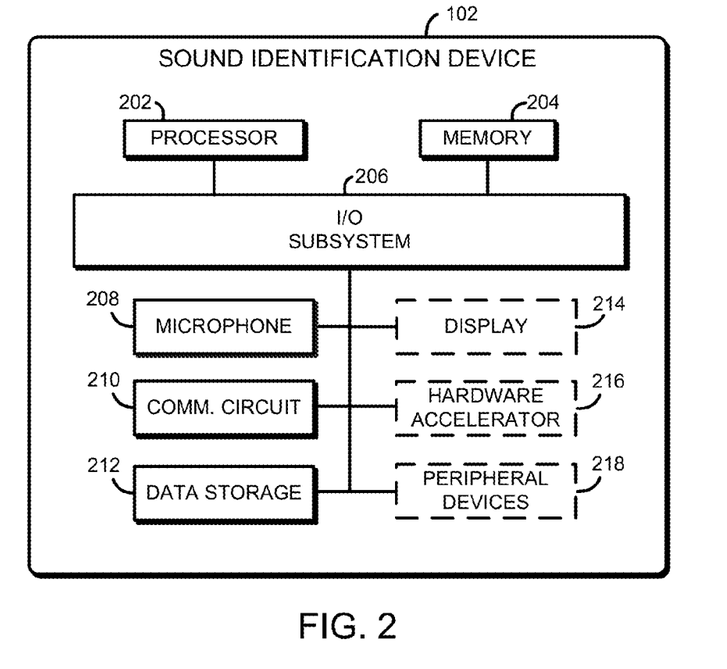

TECHNOLOGIES FOR ROBUST CRYING DETECTION USING TEMPORAL CHARACTERISTICS OF ACOUSTIC FEATURES

BACKGROUND

Despite the computational ability of modern compute devices, certain tasks such as pattern recognition and sound detection and identification remain challenging, and even identifying a single sound such as a crying child is not yet perfected. Machine learning techniques such as neural networks are often used for pattern-recognition tasks. One important aspect of using those techniques is generating a small number of parameters from a data set that is useful for identifying the desired sounds.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 1 is a simplified block diagram of at least one embodiment of a system for sound identification;

FIG. 2 is a simplified block diagram of at least one embodiment of a sound identification device of the system for sound identification of FIG. 1;

FIG. 3 is a simplified block diagram of at least one embodiment of a mobile compute device of the system for sound identification of FIG. 1;

FIG. 4 is a block diagram of at least one embodiment of an environment that may be established by the sound identification device of FIG. 2;

FIG. 5 is a block diagram of at least one embodiment of an environment that may be established by the mobile compute device of FIG. 3;

FIGS. 6A-6B is a simplified flow diagram of at least one embodiment of a method for identifying a sound that may be executed by the sound identification device of FIG. 2;

FIG. 7 is a simplified flow diagram of at least one embodiment of a method for receiving a notification from a sound identification device that may be executed by the mobile compute device of FIG. 3; and FIG. 8 is a simplified illustration of sound data that may be acquired and manipulated by the sound identification device of FIG. 2.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for sound identification includes a sound identification device 102 and a mobile compute device 104, communicating over a network 106. In the illustrative embodiment, in use, the sound identification device 102 captures a sound 108, such as a cry from an infant 110, a cough from a nearby person, or other sound. As described in more detail below, the sound identification device 102 determines a relatively small number of parameters (e.g., on the order of 200) that represent how acoustic features of the sound 108 vary over a relatively long time (e.g., on the order of one second). Based on such parameters, the sound identification device 102 determines whether the sound 108 matches a pre-defined sound, such as a cry from an infant or baby or a cough.

Referring now to FIG. 2, the sound identification device 102 may be embodied as any type of compute device capable of capturing audio and performing the functions described herein. For example, the sound identification device 102 may be embodied as or otherwise be included in, without limitation, an embedded computing system such as a baby monitor, a System-on-a-Chip (SoC), a desktop computer, a server computer, a smartphone, a cellular phone, a tablet computer, a notebook computer, a laptop computer, a wearable computer, a handset, a messaging device, a camera device, a multiprocessor system, a processor-based system, a consumer electronic device, and/or any other computing device. The illustrative sound identification device 102 includes a processor 202, a memory 204, an input/output (I/O) subsystem 206, a microphone 208, a communication circuit 210, and data storage 212. In some embodiments, one or more of the illustrative components of the sound identification device 102 may be incorporated in, or otherwise form a portion of, another component. For example, the memory 204, or portions thereof, may be incorporated in the processor 202 in some embodiments.

The processor 202 may be embodied as any type of processor capable of performing the functions described herein. For example, the processor 202 may be embodied as a single or multi-core processor(s), a single or multi-socket processor, a digital signal processor, a graphics processor, a microcontroller, or other processor or processing/controlling circuit. Similarly, the memory 204 may be embodied as any type of volatile or non-volatile memory or data storage capable of performing the functions described herein. In operation, the memory 204 may store various data and software used during operation of the sound identification device 102 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the sound identification device 102. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 204, and other components of the sound identification device 102 on a single integrated circuit chip.

The microphone 208 may be embodied as any type of device capable of converting sound into an electrical signal. To do so, the microphone 208 may utilize any suitable technology including, but not limited to, electromagnetic induction, capacitance change, and/or piezoelectricity.

The communication circuit 210 may be embodied as any type of communication circuit, device, or collection thereof, capable of enabling communications between the sound identification device 102 and the mobile compute device 104 and/or other devices. To do so, the communication circuit 210 may be configured to use any one or more communication technology and associated protocols (e.g., Ethernet, Bluetooth®, Wi-Fi®, WiMAX, near field communication (NFC), etc.) to effect such communication.

The data storage 212 may be embodied as any type of device or devices configured for the short-term or long-term storage of data. For example, the data storage 212 may include any one or more memory devices and circuits, memory cards, hard disk drives, solid-state drives, or other data storage devices.

Of course, in some embodiments, the sound identification device 102 may include other or additional components, such as those commonly found in a compute device. For example, the sound identification device 102 may also have a display 214, a hardware accelerator 216, and/or peripheral devices 218 such as a keyboard, mouse, camera, speaker, etc.

The display 214 may be embodied as any type of display on which information may be displayed to a user of the sound identification device 102, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

The hardware accelerator 216 may be embodied as any processing device capable of performing certain types of processing, such as determining whether sound data corresponds to a pre-defined sound, as discussed in more detail below, in a faster and/or more energy efficient manner than the processor 202. For example, the hardware accelerator 216 may be embodied as a graphics processing unit, field-programmable gate array, or the like.

Figure 3:
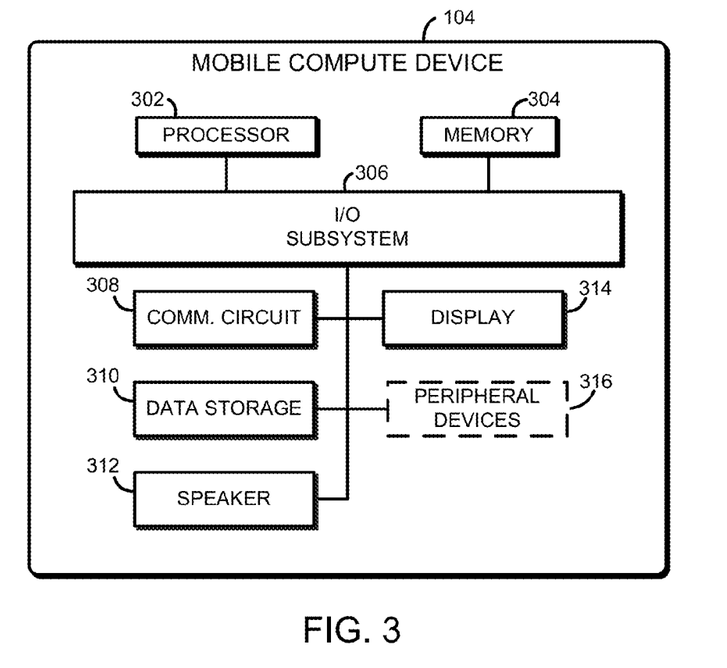

Referring now to FIG. 3, the mobile compute device 104 may be embodied as any type of compute device capable of communicating with the sound identification device 102 and performing the functions described herein. For example, the mobile compute device 104 may be embodied as or otherwise be included in, without limitation, a smartphone, a cellular phone, a tablet computer, an embedded computing system, a System-on-a-Chip (SoC), a desktop computer, a server computer, a notebook computer, a laptop computer, a wearable computer, a handset, a messaging device, a camera device, a multiprocessor system, a processor-based system, a consumer electronic device, and/or any other computing device. The illustrative mobile compute device 104 includes a processor 302, a memory 304, an I/O subsystem 306, a communication circuit 308, data storage 310, a speaker 312, a display 314, and optional peripheral devices 316. Each of the processor 302, the memory 304, I/O subsystem 306, the communication circuit 308, the data storage 310, the display 314, and the peripheral devices 316 may be similar to the corresponding components of the sound identification device 102. As such, the description of those components of the sound identification device 102 is equally applicable to the description of those components of the mobile compute device 104 and is not repeated herein for clarity of the description. The speaker 312 may be any kind of device capable of converting an electrical signal into sound, and includes tabletop speakers, headphones, and the like.

Figure 1:
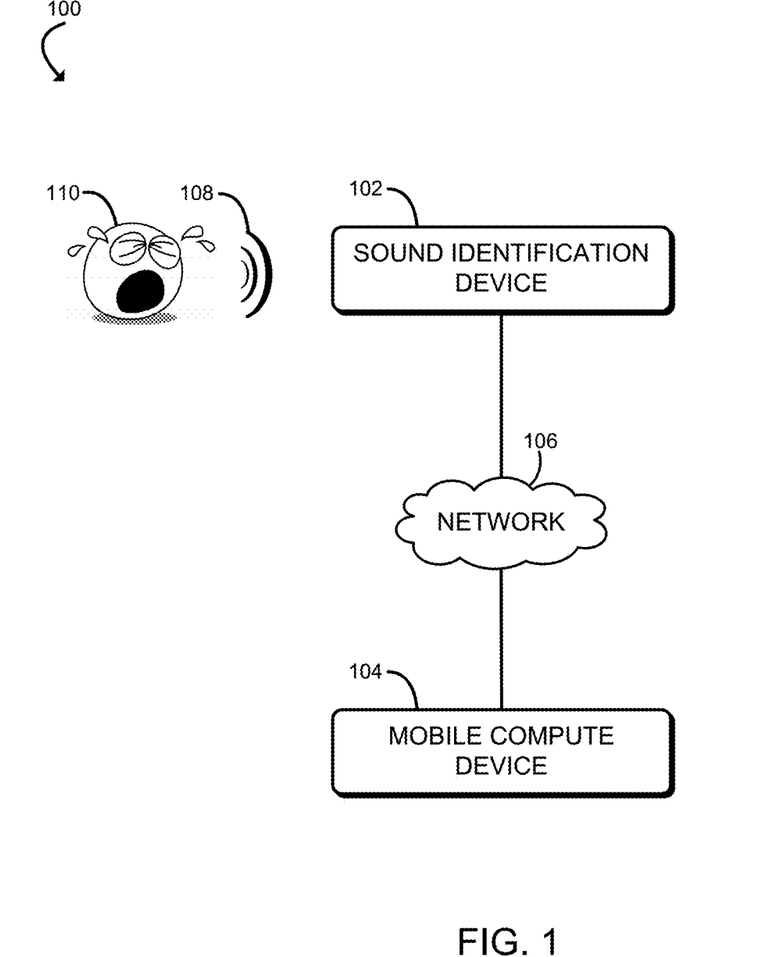

Referring back to FIG. 1, the sound identifications device 102 and the mobile compute device 104 are configured to communicate over the network 106 as discussed above. The network 106 may be embodied as any type of communication network capable of facilitating communication between the sound identification device 102 and the mobile compute device 104. The network 106 may be embodied as or otherwise include Ethernet, Bluetooth®, Wi-Fi®, WiMAX, near field communication (NFC), cellular communication, analog communication, etc. Additionally or alternatively, the sound identification device 102 may communicate directly with the mobile compute device 104, without using a network of any kind.

Figure 4:
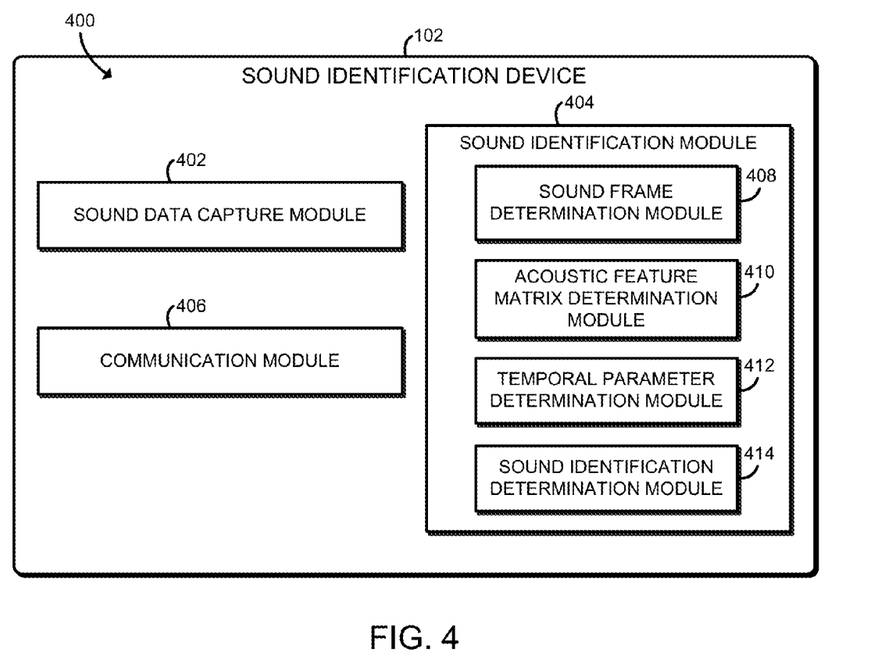

Referring now to FIG. 4, in use, the sound identification device 102 may establish an environment 400. The illustrative environment 400 includes a sound data capture module 402, a sound identification module 404, and a communication module 406. The various modules of the environment 400 may be embodied as hardware, software, firmware, or a combination thereof. For example, the various modules, logic, and other components of the environment 400 may form a portion of, or otherwise be established by, the processor 202 or other hardware components of the sound identification device 102. As such, in some embodiments, one or more of the modules of the environment 400 may be embodied as circuitry or collection of electrical devices (e.g., a sound data capture circuit 402, a sound identification circuit 404, a communication circuit 406, etc.). It should be appreciated that, in such embodiments, one or more of the circuits (e.g., the sound data capture circuit 402, the sound identification circuit 404, the communication circuit 406, etc.) may form a portion of one or more of the processor 202, the memory 204, the I/O subsystem 206, the data storage 212, and/or the optional hardware accelerator 216. Additionally, in some embodiments, one or more of the illustrative modules may form a portion of another module and/or one or more of the illustrative modules may be independent of one another.

Figure 8:
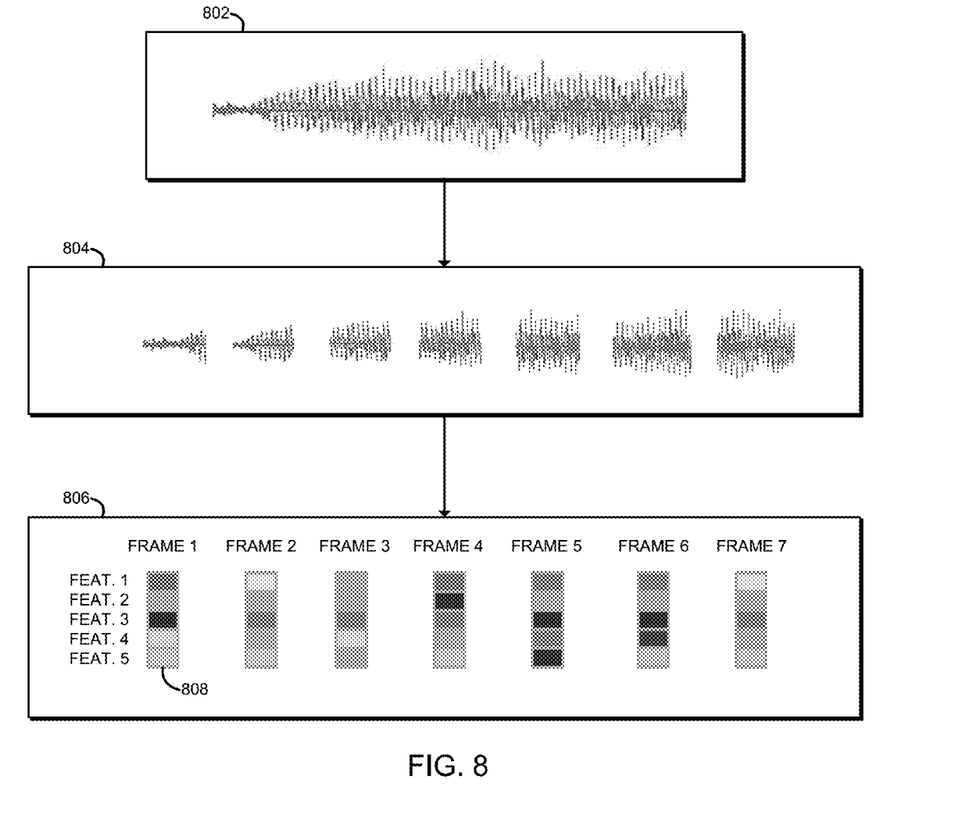

The illustrative sound data capture module 402 is configured to capture sound data from the microphone 208. Additionally or alternatively, the sound data capture module 402 may acquire sound data that has been previously captured by the sound data capture module 402 or captured by a different compute device, such as by accessing data storage 212 or by receiving the sound data via the communication module 406. In the illustrative embodiment, the sound data captured from the microphone 208 is directly indicative of the captured sound (i.e., pressure as a function of time). In other embodiments, the sound data may indicate the sound in a different way, such as by a frequency representation. One example of sound data is shown in FIG. 8, in illustration 802, which shows time on the horizontal axis, and the captured sound data (representing, e.g., pressure or motion sensed by the microphone 208) is shown as a function of time on the vertical axis.

The illustrative sound identification module 404 is configured to identify a sound based on the sound data. The sound identification module 404 includes a sound frame determination module 408, an acoustic feature matrix determination module 410, a temporal parameter determination module 412, and a sound identification determination module 414.

The sound frame determination module 408 is configured to determine one or more sound frames based on the sound data. A sound frame is a segment of sound data representing the captured sound over a particular, short time period. In some embodiments, the length of the frame is chosen such that it is long enough to determine acoustic features of the frame, but not so long that the acoustic features significantly change over the course of the frame under typical conditions (e.g., a human-made sound). In some embodiments, the length of sound data that is split into frames is determined based on the length being long enough for the acoustic features to change over time, but not so long that a large number of parameters is required to describe how the acoustic features changes in sufficient detail. Of course, what constitutes a large number of parameters and what constitutes sufficient detail may depend on the particular embodiment, such as on the pre-defined sound being identified and the method used for determining whether the sound data corresponds to the pre-defined sound.

In the illustrative embodiments, the length of a sound frame is set to 25 milliseconds (ms). In other embodiments, however, a sound frame may be longer or shorter lengths, such as lengths equal to, more than, or less than 1 ms, 5 ms, 10 ms, 15 ms, 40 ms, 50 ms, 80 ms, 100 ms, 150 ms, or 250 ms. Additionally or alternatively, some or all of the sound frames may be of different length. In some embodiments, the entire length of the captured sound data is broken up into consecutive non-overlapping sound frames. In other embodiments, some or all of the sound frames may overlap with adjacent sound frames. For example, in the illustrative embodiment, each sound frame is 25 ms, and each sound frame begins 10 ms after the previous sound frame, which means each sound frame has a 15 ms overlap with each adjacent sound frame. In still other embodiments, some or all of the sound frames may have a gap between adjacent frames, such that a portion of the sound data is not represented by the sound frames. One example of generating sound frames based on the sound data is shown in FIG. 8, in illustration 804, wherein the sound data of illustration 802 has been split up into 7 frames.

In the illustrative embodiment, the sound data is broken up into 75 frames, corresponding to a length of sound data of approximately 750 ms, since each frame begins 10 ms after the previous frame, as discussed above. Of course, shorter lengths such as 100 ms, 250 ms, or 500 ms or longer lengths such as 1 second, 2 seconds, 5 seconds, or 10 seconds may be used in some embodiments.

The acoustic feature matrix determination module 410 is configured to determine acoustic features based on the sound frames. In the illustrative embodiment, an acoustic feature vector is determined for each frame. An acoustic feature vector describes one or more acoustic features associated with the frame of sound data. The acoustic feature vectors determined by the sound frames are conveniently represented as a matrix. One example of an acoustic feature matrix is shown in FIG. 8 in illustration 806, and one example of an acoustic feature vector is shown in illustration 808. In those examples, the value of the acoustic feature vector is represented by the shading of the cell. As shown, each acoustic feature vector associated with each frame corresponds to a column of the matrix, and each acoustic feature of the acoustic feature vector corresponds to a row of the matrix. The terms "matrix," "row," "column," etc. are used as a convenient logical organization of the values of the acoustic features, and merely refers to the fact that, as described above, each value is associated with a feature vector and a frame. More generally, the acoustic feature matrix may be embodied as a two-dimensional matrix, which has one or more first-dimension vectors (e.g., rows) along a first dimension and one or more second-dimension vectors (e.g., columns) along a second dimension. Note that the use of "first" and "second" is merely for labelling purposes, and does not indicate any priority or ordering of the vectors. Of course, in use, the acoustic feature matrix need not be explicitly represented in a form similar to that shown in illustration 806 using a formal matrix data structure.

The temporal parameter determination module 412 is configured to determine one or more temporal parameters based on each acoustic feature. As described in more detail below, such determination is accomplished by generating parameters for each row of the acoustic feature matrix based on how each of the acoustic features changes over the time associated with the frames.

The sound identification determination module 414 is configured to determine whether the sound data corresponds to one or more pre-defined sounds based on the temporal parameters. As described in more detail below, such determination may be done using an algorithm trained using machine learning.

The communication module 406 is configured to communicate with one or more devices different from the sound identification device 102. In the illustrative embodiment, such communication may include providing a notification to the mobile compute device 104 when the sound identification determination module 414 determines the sound data corresponds to a pre-defined sound. Optionally, the communication module 406 may send the sound data to the mobile compute device 104.

Figure 5:
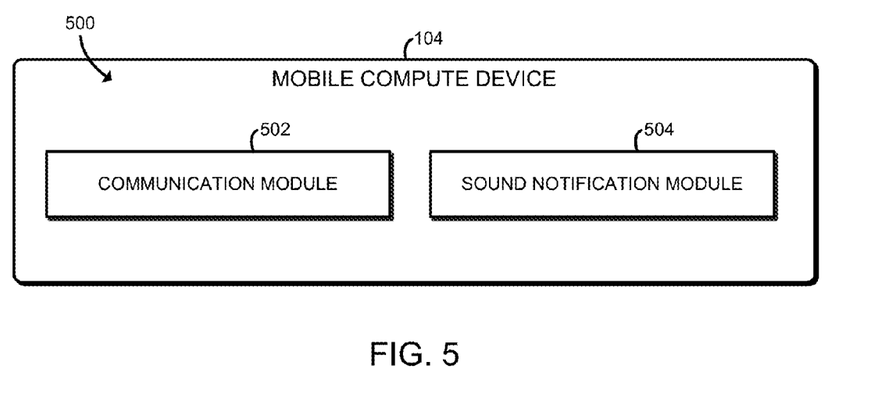

Referring now to FIG. 5, in use, the mobile compute device 104 may establish an environment 500. The illustrative environment 500 includes a communication module 502 and a sound notification module 504. As with the environment 400, the various modules of the environment 500 may be embodied as hardware, software, firmware, or a combination thereof.

The illustrative communication module 502 is configured to communicate with the sound identification device 102 and receive a notification that the sound identification device 102 has determined that the sound data matches a pre-defined sound. Optionally, the communication module 502 also receives the sound data from the sound identification device 102.

The sound notification module 504 is configured to notify a user of the mobile compute device 104 that the mobile compute device 104 has received a notification from the sound identification device 102. For example, the sound notification module 504 may provide a visual alert on the display 314 or may provide an auditory alert using the speaker 312. Optionally, the sound notification module 504 may be configured to play the sound data using the speaker 312, either automatically or when the user so indicates.

Figure 6A:
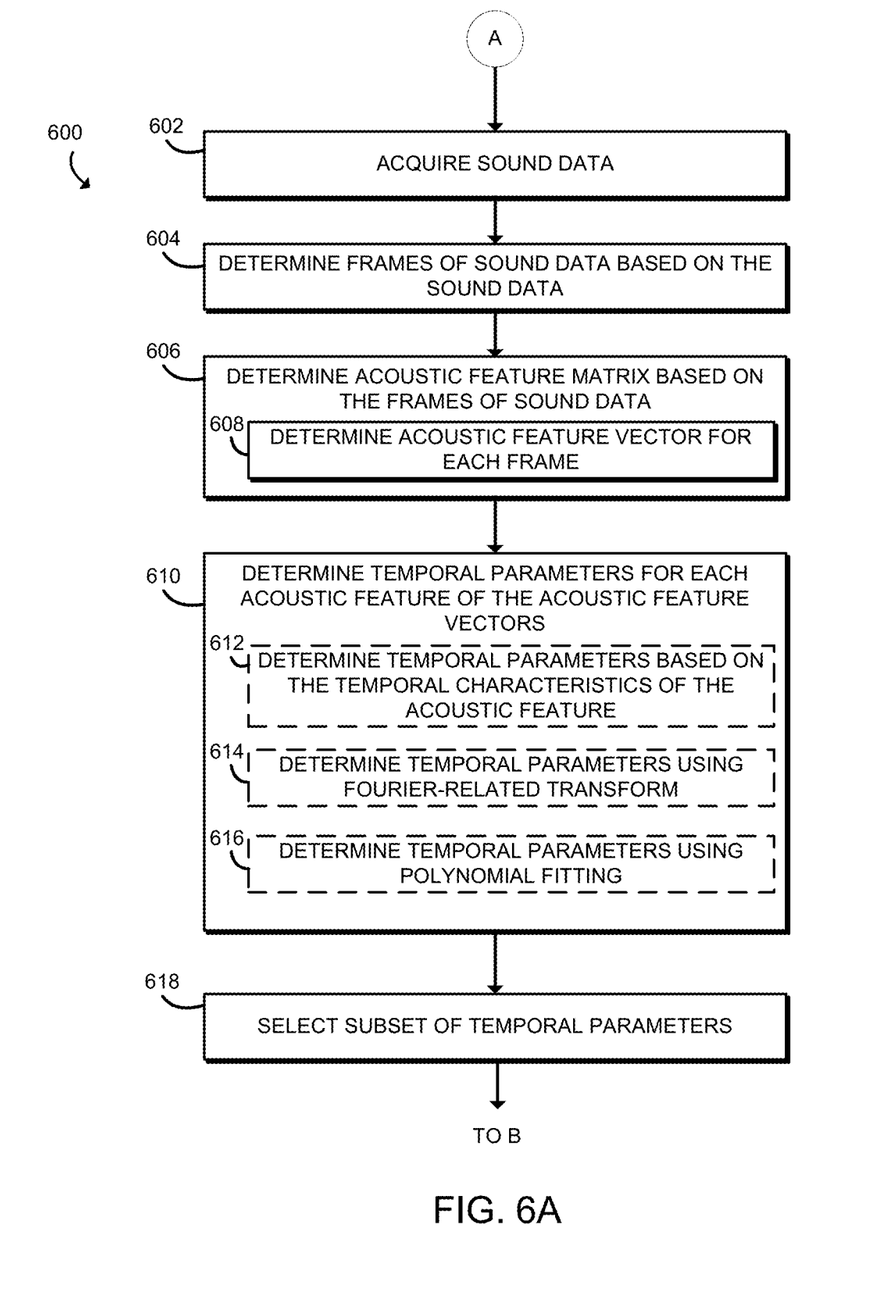

Referring now to FIG. 6A, in use, the sound identification device 102 may execute a method 600 for identifying a sound. The method 600 begins with block 602 in which the sound identification device 102 acquires sound data. In the illustrative embodiment, the sound identification device 102 acquires sound data from the microphone 208. In other embodiments, the sound identification device 102 may acquire sound data from other sources, such as from the data storage 310 or from a different compute device. One example of sound data is shown in FIG. 8, in illustration 802, which has time on the horizontal axis and pressure or motion sensed by the microphone 208 on the vertical axis, and shows the captured sound data as a function of time.

In block 604, the sound identification device 102 determines frames of sound data based on the sound data. To do so, the sound identification device 102 may "break" or divide the sound data into individual frames. As described in more detail above, each frame of sound data corresponds to a period of time (e.g., 25 ms) of the sound data.

In block 606, the sound identification device 102 determines an acoustic feature matrix based on the frames of sound data. To do so, in block 608, the sound identification device 102 determines an acoustic feature vector for each frame. The acoustic feature vector includes one or more acoustic features, and each acoustic feature is indicative of a property associated with the sound data of that particular frame, such as frequency, volume, pitch, etc. For example, in the illustrative embodiment, the sound identification device 102 determines mel-frequency cepstral coefficients based on the frame. As understood by a person having ordinary skill in the art, the mel-frequency cepstral coefficients are determined by (i) taking the Fourier transform of the sound data of the frame in order to determine a frequency spectrum of the frame, (ii) mapping the powers of the spectrum onto 23 channels of the mel scale (a perceptual scale of pitches judged by listeners to be equal in distance from one another), (iii) taking a logarithm of the power at each mel channel, and (iv) taking the discrete cosine transform of the mel log powers. In the illustrative embodiment, the acoustic feature vector is defined as the 23 coefficients of the mel-frequency cepstrum obtained from the last step of taking the discrete cosine transform. In some embodiments, a different number of channels of the mel scale may be used, such as 13 channels, 40 channels, or another number of channels higher or lower than 23. As described above and illustrated in illustration 806 of FIG. 8, the acoustic feature vector of each frame is treated as a column of an acoustic feature matrix, and each acoustic feature (e.g., each coefficient of the mel-frequency cepstrum) of the frames is treated as a row of the acoustic feature matrix. Of course, as stated above, a matrix is merely a convenient logical representation of the data described above, and need not be explicitly stored as a matrix data structure in the sound identification device 102. Additionally, it should be appreciated that other types of acoustic features in addition to or alternatively to, the mel-frequency cepstral coefficients may be determined in block 608.

In block 610, the sound identification device 102 determines temporal parameters for each acoustic feature of the acoustic feature vectors. A temporal parameter is defined as a parameter that indicates or describes how the acoustic feature changes over the period of time associated with the frames. In some embodiments, as shown in block 612, the temporal parameters are determined based on the temporal characteristics of the acoustic feature. A temporal characteristic of an acoustic feature is a characteristic that indicates how the acoustic feature changes over time, such as over the temporal duration of the frames. In the illustrative embodiment, as shown in block 614, the temporal parameters are determined using a Fourier-related transform, such as the Fourier transform, the cosine transform, the sine transform, etc. In other embodiments, as shown in block 616, the temporal parameters are determined by using polynomial fitting. Of course, additional methods may be used other than those explicitly disclosed herein.

In block 618, the sound identification device 102 selects a subset of temporal parameters. In the illustrative embodiment, the sound identification device 102 selects the parameters indicating the slow variation of the acoustic features, such as the 8 coefficients corresponding to the lowest frequencies of the Fourier-related transform. It should be appreciated that, by using only eight coefficients, the number of parameters used to determine if the sound data corresponds to the pre-defined sound is smaller. Of course, in some embodiments, the sound identification device 102 may directly determine the desired number of parameters in block 610, and may not include an explicit step of selecting a subset of temporal parameters. The method 600 subsequently continues at block 620 in FIG. 6B.

Figure 6B:
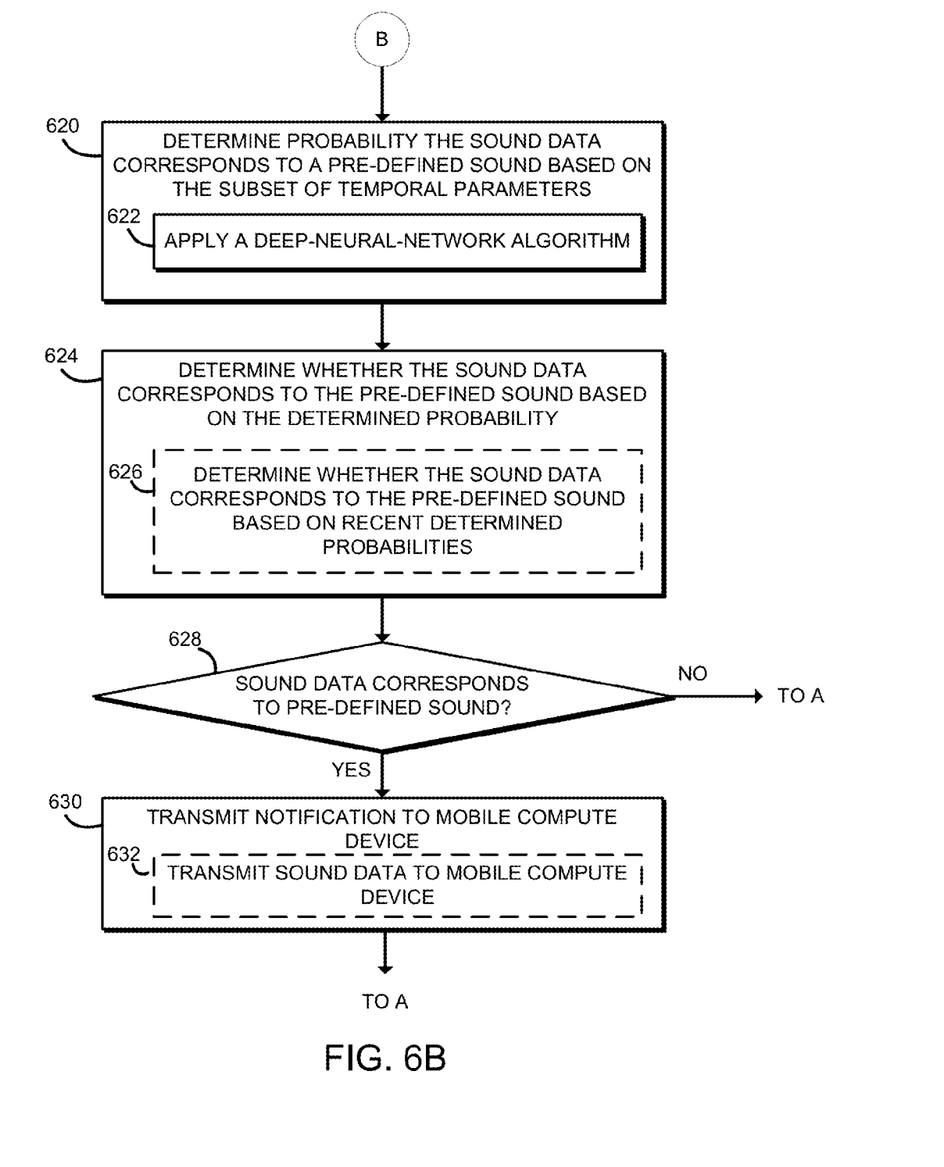

In block 620, the sound identification device 102 determines a probability that the sound data corresponds to a pre-defined sound based on the subset of temporal parameters. In the illustrative embodiment, the sound identification device 102 applies a trained deep-neural-network algorithm to determine this probability in block 622. In the illustrative embodiment, the deep-neural-network algorithm takes a number of inputs corresponding to the number of temporal parameters. Since each acoustic feature vector includes 23 features and 8 temporal parameters are determined for each acoustic feature, the total number of inputs to the deep-neural-network algorithm is 184. Of course, in other embodiments, the number of parameters may be more or less than 184, such as more or less than 50, 80, 100, 150, 200, 300, or 500. The deep-neural-network algorithm of the illustrative sound identification device 102 has previously been trained using machine learning in order to accurately determine if the sound data matches a pre-defined sound. The deep-neural-network algorithm may employ a softmax layer, backpropagation, and cross-entropy optimization as part of the training. This training may include supplying samples of sounds that match the pre-defined sound and samples of sounds that do not match the pre-defined sound, such as sounds similar to expected background noise. For example, if the pre-defined sound is an infant crying, the algorithm may be provided with a number of samples of infants crying as well as sounds similar to expected background noise such as adult conversation, road traffic noise, a vacuum cleaner, television sound, radio sound, and other common household sounds. In some embodiments, the sound identification device 102 may determine whether the sound corresponds to several different pre-defined sounds, such as a baby crying, a baby babbling, a cough, or background sounds.

Of course, in some embodiments, other machine-trained algorithms may be used to determine the probability that the sound data corresponds to a pre-defined sound, such as a shallow neural network, a support vector machine, or the like. Additionally or alternatively, the training may be ongoing as the sound identification device 102 is in use. In still other embodiments, the algorithm may not be a machine-trained algorithm, but may instead be an algorithm determined without any machine training.

In block 624, the sound identification device 102 determines whether the sound data corresponds to the pre-defined sound based on the determined probability. In some embodiments, such a determination may be accomplished by comparing the probability with a threshold. Additionally or alternatively, the sound identification device 102 may determine whether the sound data corresponds to the pre-defined sound based on recently-determined probabilities. For example, in the illustrative embodiment, the sound identification device 102 generates a new frame of sound data every 10 ms, and also generates a corresponding probability as described above every 10 ms. The sound identification device 102 may then determine whether the sound data corresponds to the pre-defined sound based on, e.g., the probabilities determined over the past 50 ms or 100 ms. This determination may be done by filtering the probabilities (e.g., by averaging them or otherwise filtering them to reduce noise and/or outliers), and then comparing the filtered probabilities to a threshold.

In block 628, if the sound data is determined to correspond to the pre-defined sound, the method 600 proceeds to block 630. Otherwise, the method 600 returns to block 602.

In block 630, the sound identification device 102 transmits a notification to the mobile compute device 104. In some embodiments, the sound identification device 102 may additionally or alternatively transmit the sound data to the mobile compute device 104. Of course, in some embodiments, the sound identification device 102 may simply record that the sound was determined to correspond to the pre-defined sound for later processing or consideration, and may not transmit any notification. Additionally, in some embodiments, the sound identification device 102 may process the sound locally, rather than (or in addition to) transmitting the notification and/or sound data to the mobile computing device 104. In some embodiments, for example, the sound identification device 102 may be configured to provide information or a notification to a user of the sound identification device 102 based on the matching pre-defined sound. For example, if the sound identification device 102 matches the sound to a cough, the sound identification device 102 may alert the user of the sound identification device 102 and suggest an appropriate action, such as ordering medicine. Regardless, after the sound identification device 102 has transmitted the notification or otherwise processed the sound in block 630, the method 600 loops back to block 602 of FIG. 6A in which the sound identification device 102 acquires additional sound data.

Figure 7:
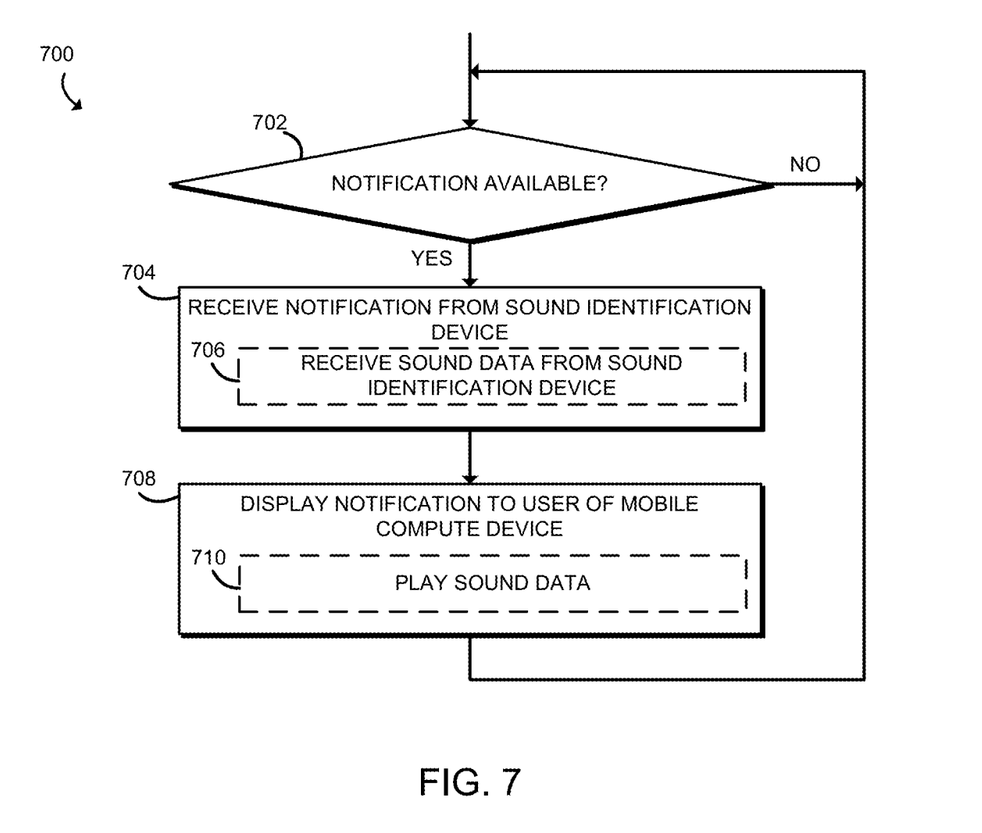

Referring now to FIG. 7, in use, the mobile compute device 104 may execute a method 700 for receiving a notification. In block 702, the mobile compute device 104 checks if a notification is available. If it is, the mobile compute device 104 proceeds to block 704. If not, the mobile compute device 104 returns to block 702.

In block 704, the mobile compute device 104 receives a notification from the sound identification device 102. In some embodiments, the mobile compute device 104 may additionally or alternatively receive sound data from the sound identification device 102 in block 706.

In block 708, the mobile compute device 104 displays the notification to a user of the mobile compute device 104. In some embodiments, the mobile compute device 104 plays the received sound data received in block 710. The method 700 then returns to block 702.

Examples

Illustrative examples of the devices, systems, and methods disclosed herein are provided below. An embodiment of the devices, systems, and methods may include any one or more, and any combination of, the examples described below.

Example 1 includes a sound identification device for identifying sounds, the sound identification device comprising a sound data capture module to acquire sound data; a sound frame determination module to determine a plurality of frames of sound data based on the sound data; a sound identification module to determine an acoustic feature matrix having two dimensions and comprising a plurality of first-dimension vectors and a plurality of second-dimension vectors, wherein each first-dimension vector of the plurality of first-dimension vectors corresponds to a corresponding frame of the plurality of frames and each second-dimension vector of the plurality of second-dimension vectors comprises an acoustic feature vector associated with the corresponding frame, and wherein each first-dimension vector of the plurality of first-dimension vectors is associated with a different acoustic feature; determine a plurality of temporal parameters for each first-dimension vector of the plurality of first-dimension vectors; determine, based on the pluralities of temporal parameters, whether the sound data corresponds to a pre-defined sound.

Example 2 includes the subject matter of Example 1, and wherein the sound data is sampled from a period of time, wherein the period of time is at least 250 milliseconds.

Example 3 includes the subject matter of any of Examples 1 and 2, and wherein each acoustic feature vector of the acoustic feature matrix comprises mel-frequency cepstrum coefficients.

Example 4 includes the subject matter of any of Examples 1-3, and wherein the pre-defined sound is a cry of an infant.

Example 5 includes the subject matter of any of Examples 1-4, and wherein the pre-defined sound is a cough.

Example 6 includes the subject matter of any of Examples 1-5, and further including a communication module to provide, based on the sound data corresponding to the cough, an alert to a user of the sound identification device and to provide, based on the sound data corresponding to the cough, a suggestion to the user.

Example 7 includes the subject matter of any of Examples 1-6, and wherein to determine the plurality of temporal parameters for each first-dimension vector of the plurality of first-dimension vectors comprises to determine the plurality of temporal parameters for each first-dimension vector of the plurality of first-dimension vectors by performing a Fourier-related transform on the corresponding first-dimension vector.

Example 8 includes the subject matter of any of Examples 1-7, and wherein the sound identification module is to select a subset of the plurality of temporal parameters, and wherein to determine, based on the plurality of temporal parameters, whether the sound data corresponds to the pre-defined sound comprises to determine, based on the subset of the plurality of temporal parameters, whether the sound data corresponds to the pre-defined sound.

Example 9 includes the subject matter of any of Examples 1-8, and wherein to determine the plurality of temporal parameters for each first-dimension vector of the plurality of first-dimension vectors comprises to determine the plurality of temporal parameters for first-dimension vector of the plurality of first-dimension vectors by performing a polynomial fit on the corresponding first-dimension vector.

Example 10 includes the subject matter of any of Examples 1-9, and wherein to determine whether the sound data corresponds to the pre-defined sound comprises to determine, using a machine-learning trained algorithm, whether the sound corresponds to a pre-defined sound.

Example 11 includes the subject matter of any of Examples 1-10, and wherein the algorithm comprises a deep neural network.

Example 12 includes the subject matter of any of Examples 1-11, and wherein to determine whether the sound data corresponds to the pre-defined sound comprises to determine a probability that the sound data corresponds to the pre-defined sound and to compare the probability to a threshold.

Example 13 includes the subject matter of any of Examples 1-12, and wherein to compare the probability to the threshold comprises to determine a plurality of probabilities, wherein each probability of the plurality of probabilities is indicative of whether the sound data corresponds to the pre-defined sound, and wherein each probability of the plurality of probabilities is based on a different set of frames of sound data; determine a filtered probability based on the plurality of probabilities; and compare the filtered probability to the threshold.

Example 14 includes the subject matter of any of Examples 1-13, and further including a communication module to transmit a notification to a mobile compute device.

Example 15 includes the subject matter of any of Examples 1-14, and wherein the communication module is further to transmit the sound data to the mobile compute device.

Example 16 includes a method for sound identification by a sound identification device, the method comprising acquiring, by the sound identification device, sound data; determining, by the sound identification device, a plurality of frames of sound data based on the sound data; determining, by the sound identification device, an acoustic feature matrix having two dimensions and comprising a plurality of first-dimension vectors and a plurality of second-dimension vectors, wherein each second-dimension vector of the plurality of second-dimension vectors corresponds to a corresponding frame of the plurality of frames and each second-dimension vector of the plurality of second-dimension vectors comprises an acoustic feature vector associated with the corresponding frame, and wherein each first-dimension vector of the plurality of first-dimension vectors is associated with a different acoustic feature; determining, by the sound identification device, a plurality of temporal parameters for each first-dimension vector of the plurality of first-dimension vectors; determining, by the sound identification device, based on the pluralities of temporal parameters, whether the sound data corresponds to a pre-defined sound.

Example 17 includes the subject matter of Example 16, and wherein the sound data is sampled from a period of time, wherein the period of time is at least 250 milliseconds.

Example 18 includes the subject matter of any of Examples 16 and 17, and wherein each acoustic feature vector of the acoustic feature matrix comprises mel-frequency cepstrum coefficients.

Example 19 includes the subject matter of any of Examples 16-18, and wherein the pre-defined sound is a cry of an infant.

Example 20 includes the subject matter of any of Examples 16-19, and wherein the pre-defined sound is a cough.

Example 21 includes the subject matter of any of Examples 16-20, and further including providing, by the sound identification device and based on the sound data corresponding to the cough, an alert to a user of the sound identification device and providing, by the sound identification device and based on the sound data corresponding to the cough, a suggestion to the user.

Example 22 includes the subject matter of any of Examples 16-21, and wherein determining the plurality of temporal parameters for each first-dimension vector of the plurality of first-dimension vectors comprises determining the plurality of temporal parameters for each first-dimension vector of the plurality of first-dimension vectors by performing a Fourier-related transform on the corresponding first-dimension vector.

Example 23 includes the subject matter of any of Examples 16-22, and further including selecting, by the sound identification device, a subset of the plurality of temporal parameters, wherein determining, based on the plurality of temporal parameters, whether the sound data corresponds to the pre-defined sound comprises determining, based on the subset of the plurality of temporal parameters, whether the sound data corresponds to the pre-defined sound.

Example 24 includes the subject matter of any of Examples 16-23, and wherein determining the plurality of temporal parameters for each first-dimension vector of the plurality of first-dimension vectors comprises determining the plurality of temporal parameters for each first-dimension vector of the plurality of first-dimension vectors by performing a polynomial fit on the corresponding first-dimension vector.

Example 25 includes the subject matter of any of Examples 16-24, and wherein determining whether the sound data corresponds to the pre-defined sound comprises determining, using a machine-learning trained algorithm, whether the sound corresponds to a pre-defined sound.

Example 26 includes the subject matter of any of Examples 16-25, and wherein the algorithm comprises a deep neural network.

Example 27 includes the subject matter of any of Examples 16-26, and wherein determining, based on the plurality of temporal parameters, whether the sound data corresponds to the pre-defined sound comprises determining a probability that the sound data corresponds to the pre-defined sound and comparing the probability to a threshold.

Example 28 includes the subject matter of any of Examples 16-27, and wherein comparing the probability to the threshold comprises determining, by the sound identification device, a plurality of probabilities, wherein each probability of the plurality of probabilities is indicative of whether the sound data corresponds to the pre-defined sound, and wherein each probability of the plurality of probabilities is based on a different set of frames of sound data; determining a filtered probability based on the plurality of probabilities; and comparing the filtered probability to the threshold.

Example 29 includes the subject matter of any of Examples 16-28, and further including transmitting a notification to a mobile compute device.

Example 30 includes the subject matter of any of Examples 16-29, and further including transmitting the sound data to the mobile compute device.

Example 31 includes one or more machine-readable storage media comprising a plurality of instructions stored thereon that in response to being executed result in a sound identification device performing the method of any of Examples 16-30.

Example 32 includes a sound identification device for identifying sounds comprising means for acquiring sound data; means for determining a plurality of frames of sound data based on the sound data; means for determining an acoustic feature matrix having two dimensions and comprising a plurality of first-dimension vectors and a plurality of second-dimension vectors, wherein each second-dimension vector of the plurality of second-dimension vectors corresponds to a corresponding frame of the plurality of frames and each second-dimension vector of the plurality of second-dimension vectors comprises an acoustic feature vector associated with the corresponding frame, and wherein each first-dimension vector of the plurality of first-dimension vectors is associated with a different acoustic feature; means for determining a plurality of temporal parameters for each first-dimension vector of the plurality of first-dimension vectors; means for determining based on the pluralities of temporal parameters, whether the sound data corresponds to a pre-defined sound.

Example 33 includes the subject matter of Example 32, and wherein the sound data is sampled from a period of time, wherein the period of time is at least 250 milliseconds.

Example 34 includes the subject matter of any of Examples 32 and 33, and wherein each acoustic feature vector of the acoustic feature matrix comprises mel-frequency cepstrum coefficients.

Example 35 includes the subject matter of any of Examples 32-34, and wherein the pre-defined sound is a cry of an infant.

Example 36 includes the subject matter of any of Examples 32-35, and wherein the pre-defined sound is a cough.

Example 37 includes the subject matter of any of Examples 32-36, and further including means for providing, based on the sound data corresponding to the cough, an alert to a user of the sound identification device and means for providing, by the sound identification device and based on the sound data corresponding to the cough, a suggestion to the user.

Example 38 includes the subject matter of any of Examples 32-37, and wherein the means for determining the plurality of temporal parameters for each first-dimension vector of the plurality of first-dimension vectors comprises means for determining the plurality of temporal parameters for each first-dimension vector of the plurality of first-dimension vectors by performing a Fourier-related transform on the corresponding first-dimension vector.

Example 39 includes the subject matter of any of Examples 32-38, and further including means for selecting, by the sound identification device, a subset of the plurality of temporal parameters, wherein the means for determining, based on the plurality of temporal parameters, whether the sound data corresponds to the pre-defined sound comprises means for determining, based on the subset of the plurality of temporal parameters, whether the sound data corresponds to the pre-defined sound.

Example 40 includes the subject matter of any of Examples 32-39, and wherein the means for determining the plurality of temporal parameters for each first-dimension vector of the plurality of first-dimension vectors comprises means for determining the plurality of temporal parameters for each first-dimension vector of the plurality of first-dimension vectors by performing a polynomial fit on the corresponding first-dimension vector.

Example 41 includes the subject matter of any of Examples 32-40, and wherein the means for determining whether the sound data corresponds to the pre-defined sound comprises means for determining, using a machine-learning trained algorithm, whether the sound corresponds to a pre-defined sound.

Example 42 includes the subject matter of any of Examples 32-41, and wherein the algorithm comprises a deep neural network.

Example 43 includes the subject matter of any of Examples 32-42, and wherein the means for determining, based on the plurality of temporal parameters, whether the sound data corresponds to the pre-defined sound comprises means for determining a probability that the sound data corresponds to the pre-defined sound and comparing the probability to a threshold.

Example 44 includes the subject matter of any of Examples 32-43, and wherein the means for comparing the probability to the threshold comprises means for determining a plurality of probabilities, wherein each probability of the plurality of probabilities is indicative of whether the sound data corresponds to the pre-defined sound, and wherein each probability of the plurality of probabilities is based on a different set of frames of sound data; means for determining a filtered probability based on the plurality of probabilities; and means for comparing the filtered probability to the threshold.

Example 45 includes the subject matter of any of Examples 32-44, and further including means for transmitting a notification to a mobile compute device.

Example 46 includes the subject matter of any of Examples 32-45, and further including means for transmitting the sound data to the mobile compute device.

The invention claimed is:

1. A sound identification device for identifying sounds, the sound identification device comprising:
a sound data capture module to acquire sound data;
a sound frame determination module to determine a plurality of frames of sound data based on the sound data;
a sound identification module to:
determine an acoustic feature matrix having two dimensions and comprising a plurality of first-dimension vectors and a plurality of second-dimension vectors, wherein each second-dimension vector of the plurality of second-dimension vectors corresponds to a corresponding frame of the plurality of frames and each first-dimension vector of the plurality of first-dimension vectors comprises an acoustic feature vector associated with the corresponding frame, and wherein each first-dimension vector of the plurality of first-dimension vectors is associated with a different acoustic feature;

determine a plurality of temporal parameters for each first-dimension vector of the plurality of first-dimension vectors;

determine, based on the pluralities of temporal parameters, whether the sound data corresponds to a pre-defined sound, wherein each of the plurality of temporal parameters is based on how the acoustic feature associated with the corresponding first-dimension vector changes over the time associated with the plurality of frames.

2. The sound identification device of claim 1, wherein each acoustic feature vector of the acoustic feature matrix comprises mel-frequency cepstrum coefficients.

3. The sound identification device of claim 1, wherein the pre-defined sound is a cry of an infant.

4. The sound identification device of claim 1, wherein the pre-defined sound is a cough.

5. The sound identification device of claim 4, further comprising a communication module to provide, based on the sound data corresponding to the cough, an alert to a user of the sound identification device and to provide, based on the sound data corresponding to the cough, a suggestion to the user.

6. The sound identification device of claim 1, wherein to determine the plurality of temporal parameters for each first-dimension vector of the plurality of first-dimension vectors comprises to determine the plurality of temporal parameters for each first-dimension vector of the plurality of first-dimension vectors by performing a Fourier-related transform on the corresponding first-dimension vector.

7. The sound identification device of claim 6, wherein the sound identification module is to select a subset of the plurality of temporal parameters, and wherein to determine, based on the plurality of temporal parameters, whether the sound data corresponds to the pre-defined sound comprises to determine, based on the subset of the plurality of temporal parameters, whether the sound data corresponds to the pre-defined sound.

8. The sound identification device of claim 1, wherein to determine whether the sound data corresponds to the pre-defined sound comprises to determine a probability that the sound data corresponds to the pre-defined sound and to compare the probability to a threshold.

9. The sound identification device of claim 1, further comprising a communication module to transmit a notification to a mobile compute device.

10. One or more non-transitory machine-readable media comprising a plurality of instructions stored thereon that, when executed, cause a sound identification device to:

acquire sound data;

determine a plurality of frames of sound data based on the sound data;

determine an acoustic feature matrix having two dimensions and comprising a plurality of first-dimension vectors and a plurality of second-dimension vectors, wherein each second-dimension vector of the plurality of second-dimension vectors corresponds to a corresponding frame of the plurality of frames and each first-dimension vector of the plurality of first-dimension vectors comprises an acoustic feature vector associated with the corresponding frame, and wherein each first-dimension vector of the plurality of first-dimension vectors is associated with a different acoustic feature;

determine a plurality of temporal parameters for each first-dimension vector of the plurality of first-dimension vectors;

determine based on the pluralities of temporal parameters, whether the sound data corresponds to a pre-defined sound.

11. The one or more non-transitory computer-readable media of claim 10, wherein each acoustic feature vector of the acoustic feature matrix comprises mel-frequency cepstrum coefficients.

12. The one or more non-transitory computer-readable media of claim 10, wherein the pre-defined sound is a cry of an infant.

13. The one or more non-transitory computer-readable media of claim 10, wherein the pre-defined sound is a cough.

14. The one or more non-transitory computer-readable media of claim 10, wherein to determine the plurality of temporal parameters for each first-dimension vector of the plurality of first-dimension vectors comprises to determine the plurality of temporal parameters for each first-dimension vector of the plurality of first-dimension vectors by performing a Fourier-related transform on the corresponding first-dimension vector.

15. The one or more non-transitory computer-readable media of claim 14, wherein the plurality of instructions further cause the sound identification device to select a subset of the plurality of temporal parameters, wherein to determine, based on the plurality of temporal parameters, whether the sound data corresponds to the pre-defined sound comprises to determine, based on the subset of the plurality of temporal parameters, whether the sound data corresponds to the pre-defined sound.

16. The one or more non-transitory computer-readable media of claim 10, wherein to determine, based on the plurality of temporal parameters, whether the sound data corresponds to the pre-defined sound comprises to determine a probability that the sound data corresponds to the pre-defined sound and to compare the probability to a threshold.

17. The one or more non-transitory computer-readable media of claim 10, wherein the plurality of instructions further cause the sound identification device to transmit a notification to a mobile compute device.

18. A method for sound identification by a sound identification device, the method comprising:

acquiring, by the sound identification device, sound data;

determining, by the sound identification device, a plurality of frames of sound data based on the sound data;

determining, by the sound identification device, an acoustic feature matrix having two dimensions and comprising a plurality of first-dimension vectors and a plurality of second-dimension vectors, wherein each second-dimension vector of the plurality of second-dimension vectors corresponds to a corresponding frame of the plurality of frames and each first-dimension vector of the plurality of first-dimension vectors comprises an acoustic feature vector associated with the corresponding frame, and wherein each first-dimension vector of the plurality of first-dimension vectors is associated with a different acoustic feature;

determining, by the sound identification device, a plurality of temporal parameters for each first-dimension vector of the plurality of first-dimension vectors;

determining, by the sound identification device, based on the pluralities of temporal parameters, whether the sound data corresponds to a pre-defined sound.

19. The method of claim 18, wherein each acoustic feature vector of the acoustic feature matrix comprises mel-frequency cepstrum coefficients.

20. The method of claim 18, wherein the pre-defined sound is a cry of an infant.

21. The method of claim 18, wherein the pre-defined sound is a cough.

22. The method of claim 18, wherein determining the plurality of temporal parameters for each first-dimension vector of the plurality of first-dimension vectors comprises determining the plurality of temporal parameters for each first-dimension vector of the plurality of first-dimension vectors by performing a Fourier-related transform on the corresponding first-dimension vector.

23. The method of claim 22, further comprising selecting, by the sound identification device, a subset of the plurality of temporal parameters, wherein determining, based on the plurality of temporal parameters, whether the sound data corresponds to the pre-defined sound comprises determining, based on the subset of the plurality of temporal parameters, whether the sound data corresponds to the pre-defined sound.

24. The method of claim 18, wherein determining, based on the plurality of temporal parameters, whether the sound data corresponds to the pre-defined sound comprises determining a probability that the sound data corresponds to the pre-defined sound and comparing the probability to a threshold.

25. The method of claim 18, further comprising transmitting a notification to a mobile compute device.

\* \* \* \* \*